United States Patent [19]
Bryant

[11] Patent Number: 5,477,667
[45] Date of Patent: Dec. 26, 1995

[54] GARDENING IMPLEMENT

[76] Inventor: Louis L. Bryant, HCR 4, Box 1013, Burnet, Tex. 78611

[21] Appl. No.: 249,333

[22] Filed: May 27, 1994

[51] Int. Cl.$^6$ .............................. A01B 1/06; A01D 7/10
[52] U.S. Cl. ...................................... 56/400.06; 172/375
[58] Field of Search .......................... 56/400.06, 400.04, 56/400.05, 400.07; 172/373, 374, 375; 7/114

[56] References Cited

U.S. PATENT DOCUMENTS

| | | | |
|---|---|---|---|
| 146,083 | 12/1873 | Lunquest | 56/400.07 |
| 2,780,976 | 2/1957 | Koering | 56/400.07 |
| 4,483,133 | 11/1984 | Pasley | 56/400.06 |
| 4,915,179 | 4/1990 | Hawk | 172/375 |

Primary Examiner—Terry Lee Melius
Attorney, Agent, or Firm—Michael I. Kroll

[57] ABSTRACT

A gardening implement is disclosed having a handle, a base attached to the handle, and a series of tines extending from the base. Between the distal ends of the tines and the base, perpendicular to the tines, and extending between them, is a rod or member that serves to aid in catching the uprooted plants. In addition, a U-shaped member is attached to the base extending opposite and away from the tines' distal ends.

1 Claim, 1 Drawing Sheet

GARDENING IMPLEMENT

CROSS REFERENCE TO RELATED MATERIALS

The present invention was disclosed to the United States Patent and Trademark Office through the Document Disclosure program. The registration number is 334,371 and the date of receipt was Jun. 28, 1993.

BACKGROUND OF THE INVENTION

1. Field of the Invention

The present invention relates to gardening implements. More specifically, it relates to gardening implements wherein the device includes a handle, a tined working portion, a serrated cutting portion for weeding mounted opposite to the tined portion, and which further includes a second weeding portion that consists of an attachment mounted perpendicular to, and extending between the tines to aid in the removal of weeds from the loosened earth.

2. Description of the Prior Art

One of the most trying parts of gardening is the removal of the unwanted plants or weeds that attempt to grow within the cultivated area. Common devices, such as hoes still leave the small plants embedded within or under clods of dirt, and the tined or forked device can also leave the plants buried or otherwise hidden, forcing the user to pick and grasp after them, and thus enhancing the possibility that a number of them could be missed, only to take root again. The present invention is designed to be an improvement on these common prior art devices, a number of which were uncovered during a search and are hereinafter discussed.

Firstly, in U.S. Pat. No. 146,083 issued on Dec. 30, 1873 to John M. Lunquest there is disclosed a garden implement wherein a multi-toothed hoe has bolted thereon a frame carrying a plate that is slightly curved and provided with teeth. The device, unlike the present invention, does not show the secondary weeding rod or plates disposed between the tines of the hoe portion.

In U.S. Pat. No. 2,225,108 issued on Dec. 17, 1940 to Edward P. Glassock there is shown a combination garden implement. In this device there is a coarse rake and a fine rake, and movably mounted on the handle such that it can be disposed between the two rake types, is a roller for smoothing the earth. This document does not disclose any blades, rods, or the like disposed between the tines of either of the rakes, as will be seen in applicant's invention.

Another patent of interest is U.S. Pat. No. 4,212,150 issued on Jul. 15, 1980 to Frank M. Dmochowski. This discloses a rake attachment for a garden tool wherein a rake is pivotably mounted on a common handle with a weed cutter. Unlike applicant's present invention however, the tines of the rake are not adapted to be a secondary weeding apparatus and lack any perpendicular members to assist in removing the weed from the ground.

Lastly, U.S. Pat. No. 4,483,133 issued on Nov. 20, 1984 to Harry M. Pasley discloses a work implement having a U-shaped cultivating tool mounted on the end of a handle. Additionally, the device has tines that are movable between an extended and retracted position from the same end of the handle. As in the above patents, the document does not show or teach any members lying perpendicular to and between the tines to aid in the weeding operation.

Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

None of the above inventions and patents, taken either singly or in combination, is seen to describe the instant invention as claimed.

SUMMARY OF THE INVENTION

The present invention is a gardening implement having a handle, a base attached to the handle, and a series of tines extending from the base. Between the distal ends of the tines and the base, perpendicular to the tines, is a rod or member that serves to aid in catching the uprooted plants. In addition, a U-shaped member is attached to the base extending opposite and away from the tines distal ends.

Accordingly, it is a principal object of the invention to provide a gardening implement that includes both a cultivating blade and a tined hoe portion that can alternately be used by turning the device over.

It is another object of the invention to provide a gardening implement wherein the effect of the hoe portion is enhanced by providing members perpendicular to and extending between the tines of the hoe to assist in removing plants from the loosened soil.

It is a further object of the invention to provide a gardening implement where the U-shaped cultivating blade and the tine enhancement members can be replaceable in the event of wear.

It is a major goal of the invention to provide improved elements and arrangements thereof in an apparatus for the purposes described which is inexpensive, dependable and fully effective in accomplishing its intended purposes.

The present invention meets or exceeds all the above objects and goals. Upon further study of the specification and appended claims, further objects and advantages of this invention will become apparent to those skilled in the art.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

Figure 1:
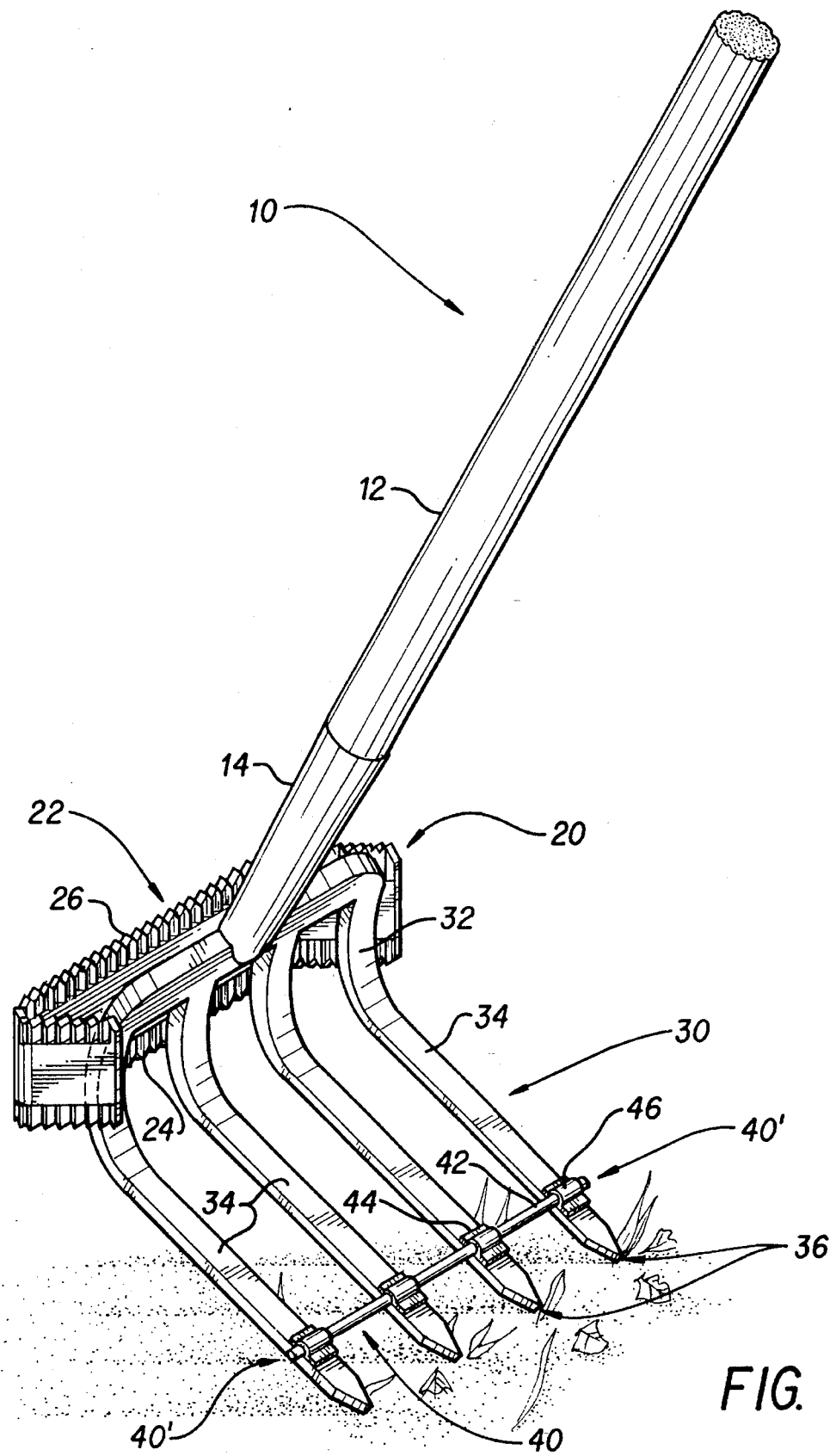
FIG. 1 is an environmental perspective view of the present invention with the U-shaped cultivating blade shown and the tines in use at the soil surface with the tine enhancement members extending between the tines on the hoe portion of the device.

The present invention is indicated generally at 10 and consists of a handle 12, a ferrule 14, a U-shaped cutting blade 20, and a tined hoe portion 30. A shovel type handle 12 is shown here, and though the length of the handle is not critical to the functioning of the invention 10, the shovel type length has been found by applicant to allow the most leverage to a user in the operation of the device 10. It should be emphasized, however, that a hand held embodiment of the invention is contemplated, with a handle of about eight to twelve inches in length, so that the device could be used while the user was seated or kneeling. Additionally, the different lengths of handles could be interchangeable, with a releasable locking mechanism (not shown) being proximate to the ferrule 14 of the invention 10.

Ferrule 14 is attached to the base 32 of the hoe portion 30 of the device 10. Protruding from the base 32 are a plurality of tines 34. At the distal ends of the tines, in the preferred embodiment shown herein, are tapered points 36. It should be noted that other types of points, such as triangular plow-type points could be used, however, without departing from the spirit of the invention. Located between the distal ends 36 and the base 32 is the tine enhancement attachment or secondary weeding means 40. In the preferred embodiment described herein, this comprises a threaded rod 42 attached to the tines at a distance of approximately one and a half inches from the distal ends 36 of the tines 34. Of course, other distances could be used. The attachment means for the rod 42, in the embodiment described herein, are a series of small plates 44 welded or otherwise attached to the tines 34. These plates have within them transverse apertures or bores 46 that receive the rod 40. The rod 40 could be permanently attached to the tines 34 by welding about these apertures, or it could be held in place by threaded attachment means (not shown) at its terminal ends 40'. It is also contemplated that the rod 42 could be replaced with a blade (not shown) that would additionally aid in severing unwanted plants from the soil.

Also attached to the base 32 of the device 10 is a generally U-shaped member or cutting blade 20. This portion of the device also could be removably attached to the base 32 by threaded means (not shown) or could be integral therewith. Additionally, it is contemplated that the U-shaped portion 2C could be attached so that it would be free to move in a limited manner about the general axis of the base 32. The U-shaped member 20 has two serrated cutting surfaces 22 on its leading edge 24 and its trailing edge 26. These serrations also may be used to aid in severing unwanted plants from the soil.

Following hereinafter is a list of the elements described in this specification:

| | |
|---|---|
| gardening implement | 10 |
| handle | 12 |
| ferrule | 14 |
| U-shaped cutting blade | 20 |
| tined hoe portion | 30 |
| hoe portion base | 32 |
| tines | 34 |
| tine points | 36 |
| tine enhancement | 40 |
| terminal rod ends | 40' |
| rod | 42 |
| plates | 44 |

-continued

| | |
|---|---|
| transverse bores | 46 |
| serrated cutting surfaces | 22 |
| blade leading edge | 24 |
| blade trailing edge | 26 |

OPERATION OF THE INVENTION

In use, it is contemplated that the user would first utilize the U-shaped member 20, with its serrated edges 22 to cut a furrow into and under the surface of the soil. The serrated edges 22 would sever a number of the unwanted plants as the device 10 was moved forwards and backwards over the area. The device 10 would then be flipped over about the axis defined by the handle 12 and the tined hoe portion 30 of the device could be used to further break up and loosen the soil. As this was occurring, the rod 42 would catch on to, and bring to the surface, any small plants that it encountered as the tines 34 moved through the area.

From the foregoing description, one skilled in the art can easily ascertain the essential characteristics of this invention and, without departing from the spirit and scope thereof, can make various changes and modifications of the invention to adapt it to various usages and conditions. For example, the artisan could easily modify the shape of the tines or serrations.

It is to be understood that the present invention is not limited to the sole embodiment described above, but encompasses any and all embodiments within the scope of the following claims:

I claim:

1. A gardening implement comprising:

a handle means;

an end piece attached to the handle, said end piece including a base extending substantially at right angles to said handle, and extending from said base are at least two tines, each of said tines having a distal end;

tine enhancement means for lifting small plants to the surface comprising a rod member extending perpendicular to and between at least two of said tines and means mounted on said tines for supporting said rod member, said rod member being located between said base and said distal ends of said tines; and means comprising a U-shaped flat member mounted on and immediately adjacent said base with the sides of said flat member curving around said base, the edges of said flat member at right angles to said handle being provided with serrated cutting edges so that when said implement is placed on the soil with said tines extending upwardly, said cutting edges will slice unwanted plants in both directions as said implement is moved forward and back on said soil.

* * * * *